United States Patent
Ishida

(10) Patent No.: US 9,256,817 B1
(45) Date of Patent: Feb. 9, 2016

(54) IMAGE FORMING APPARATUS, METHOD AND COMPUTER READABLE MEDIUM SPECIFYING CONDITION FOR CONVERTING PRINTING COLORS INTO MULTI-COLOR COMPONENT DATA WITH SPECIAL COLOR ADDED

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Takehisa Ishida, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/662,444

(22) Filed: Mar. 19, 2015

(51) Int. Cl.
*H04N 1/50* (2006.01)
*H04N 1/60* (2006.01)
*G06K 15/02* (2006.01)
*H04N 1/00* (2006.01)

(52) U.S. Cl.
CPC ........ *G06K 15/1878* (2013.01); *G06K 15/1882* (2013.01); *H04N 1/00352* (2013.01); *H04N 1/00474* (2013.01); *H04N 1/6008* (2013.01); *H04N 1/6022* (2013.01); *H04N 1/6072* (2013.01); *H04N 1/6075* (2013.01)

(58) Field of Classification Search
None
See application file for complete search history.

(56) References Cited

U.S. PATENT DOCUMENTS

| | | | | |
|---|---|---|---|---|
| 8,437,042 | B2 * | 5/2013 | Miyata | H04N 1/6011 358/518 |
| 8,437,055 | B2 * | 5/2013 | Ishizuka | H04N 1/6016 358/530 |
| 2009/0208101 | A1 * | 8/2009 | Harigai | H04N 1/60 382/167 |
| 2011/0249992 | A1 | 10/2011 | Yoshida | |
| 2013/0071023 | A1 * | 3/2013 | Sasaki | H04N 1/6016 382/167 |

* cited by examiner

*Primary Examiner* — Scott A Rogers
(74) *Attorney, Agent, or Firm* — Amin, Turocy & Watson, LLP

(57) ABSTRACT

Certain embodiments provide an image forming apparatus, including: an image forming part to form an image made of plural pixels by using plural printing colors and a special color different from the plural printing colors; an input part of image data of the image; an image processing part to output component data of the plural printing colors from the image data for each of the pixels; a user interface to specify a condition for converting the component data of the plural printing colors into component data of a multi color in which the special color is added to the plural printing colors; and a conversion part to convert the component data of the plural printing colors from the image processing part into the component data of the multi color to the image forming part based on the condition of the user interface.

10 Claims, 7 Drawing Sheets

FIG. 7

| C | 40 |
| M | 60 |
| Y | 100 |
| K | 0 |

IMAGE FORMING APPARATUS, METHOD AND COMPUTER READABLE MEDIUM SPECIFYING CONDITION FOR CONVERTING PRINTING COLORS INTO MULTI-COLOR COMPONENT DATA WITH SPECIAL COLOR ADDED

TECHNICAL FIELD

Embodiments described herein relate generally to an image forming apparatus, an image forming method and a non-transitory computer readable recording medium

BACKGROUND

Hitherto, only four kinds of toners of cyan (C), magenta (M), yellow (Y) and black (K) are used in an image forming apparatus for performing color printing.

However, when only the four printing colors are used, only colors which can be representable by the combination of CMYK can be printed.

DESCRIPTION OF THE DRAWINGS

FIG. 7 is a view showing an example of a setting method of a set value through the user interface of the image forming apparatus of the embodiment.

DETAILED DESCRIPTION

Figure 1:
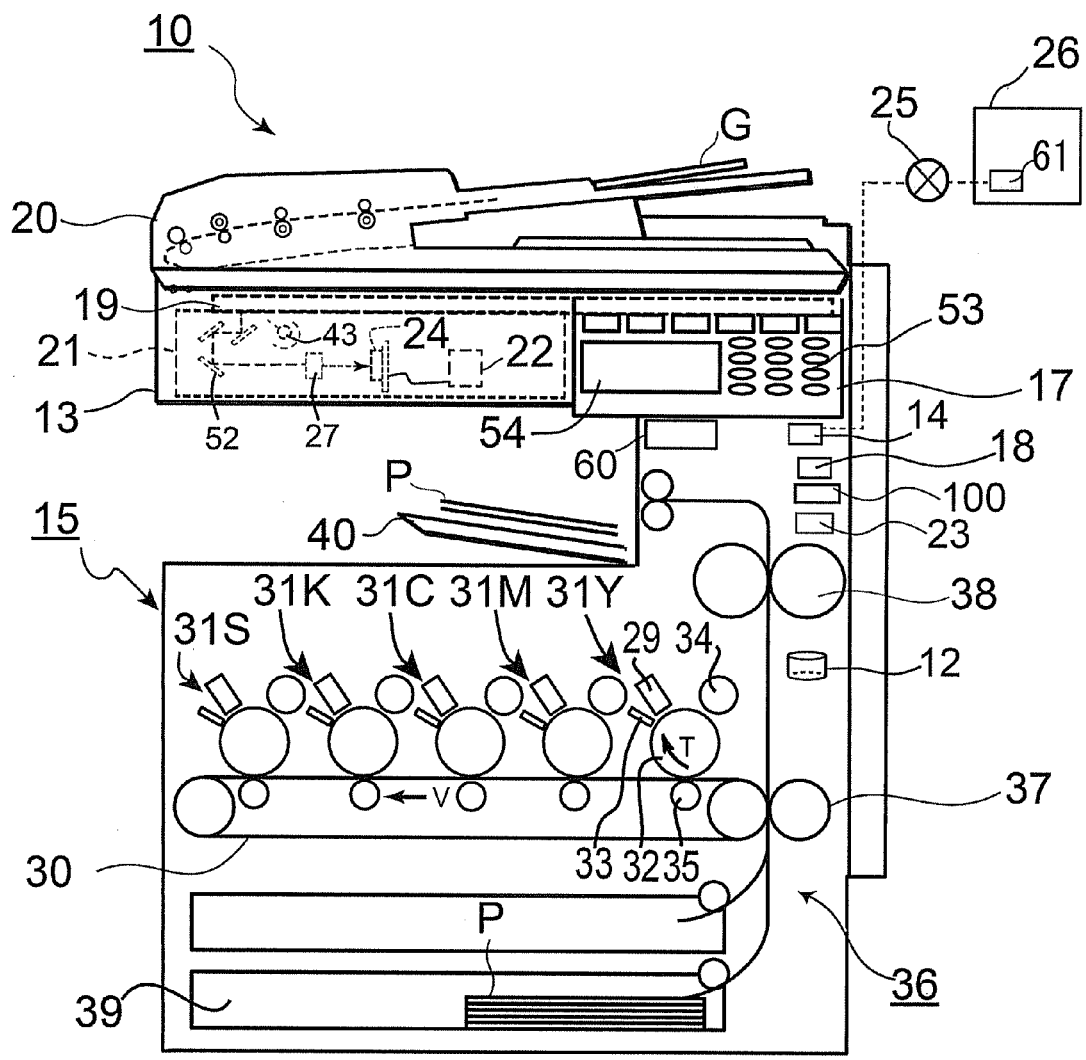
FIG. 1 is a structural view of an image forming apparatus of an embodiment.

Certain embodiments provide an image forming apparatus, including: an image forming part to form an image made of plural pixels by using plural printing colors and a special color different from the plural printing colors; an input part of image data of the image; an image processing part to output component data of the plural printing colors from the image data for each of the pixels; a user interface to specify a condition for converting the component data of the plural printing colors into component data of a multi color in which the special color is added to the plural printing colors; and a conversion part to convert the component data of the plural printing colors from the image processing part into the component data of the multi color to the image forming part based on the condition of the user interface.

Hereinafter, an image forming apparatus, an image forming method and a recording medium will be described in detail with reference to the accompanying drawings. Incidentally, the same components in the respective drawings are denoted by the same reference numerals and a duplicate description thereof is omitted.

FIG. 1 is a structural view of an image forming apparatus of an embodiment. The image forming apparatus of the embodiment is an MFP (Multi-Functional Peripheral) 10.

The MFP 10 includes a printing part 15 (image forming part), a scanner 13 (input part), a network interface 14, an image processing part 23, an operation panel 17 (user interface), an S plane generation part 18 (conversion part), and a controller 100.

The printing part 15 forms an image made of plural pixels by using four printing colors of CMYK and a special color S different from the four printing colors.

The special color S is a color which can not be represented by the combination of CMYK. Toner of the special color S is toner with gloss color, such as gold, silver or copper, toner with fluorescent color, lame-containing toner, or the like.

Both the scanner 13 and a printer driver 61 of a PC (Personal Computer) 26 through the network interface 14 are an input part of image data.

The image processing part 23 outputs component data of the four printing colors from the image data for each of the pixels.

The component data of the four printing colors are plane data of respective CMYK.

The plane data of C is a map in which "1" representing printing of C or "0" representing no printing of C is arranged for all pixels in an image region. The plane data of respective MYK are substantially the same as the plane data of C.

The operation panel 17 specifies a condition for converting the component data of the four printing colors into the component data of five colors (multi color) in which the special color S is added to the four printing colors.

The component data of the five colors are the plane data of respective CMYK and the S plane data. The MFP 10 uses, for example, 1 bit data for the S plane data.

The S plane generation part 18 converts the component data of the four printing colors from the image processing part 23 into the component data of the five colors to be sent to the image forming part 23 based on the condition of the operation panel 17.

The conversion of the component data means also replacement of the component data.

The printing part 15 includes five exposure units 29, image forming parts 31C, 31M, 31Y, 31K and 31S, and a belt 30 commonly used among the image forming parts 31C, 31M, 31Y, 31K and 31S.

In the exposure units 29, laser beams of semiconductor lasers for the respective colors are modulated by image signals. In the exposure units 29, LEDs (light emitting diode) may be used for the respective colors. The belt 30 runs endlessly in a counterclockwise direction V.

The image forming part 31Y for yellow includes a drum 32, a charger 33, a developing unit 34, and a transfer unit 35.

The drum 32 is a photoconductive drum rotating in a clockwise direction T. The charger 33 charges a surface of the drum 32. The developing unit 34 develops an electrostatic latent image on the drum 32 with toner. The transfer unit 35 primarily transfers a toner image on the drum 32 onto the belt 30.

The constitution of the image forming part 31M for magenta, the image forming part 31C for cyan, the image forming part 31K for black, and the image forming part 31S for special color are substantially the same as the configuration of the image forming part 31Y.

The printing part 15 includes corresponding toner cartridges respectively connected to the five developing units 34.

Further, the printing part 15 includes a sheet conveying mechanism 36, a secondary transfer unit 37, a fixing unit 38 and a tray 40.

The sheet conveying mechanism 36 pulls up a sheet P from a paper feeding part 39 and guides the sheet P to the printing part 15.

The secondary transfer unit 37 secondarily transfers four-color toner images formed by the image forming parts 31C, 31M, 31Y and 31K onto the sheet P.

The fixing unit 38 fixes the unfixed toner images on the sheet P. The sheet conveying mechanism 36 ejects the sheet on which the image is fixed onto the tray 40.

The scanner 13 is an input part of image data. The scanner 13 generates the image data to be inputted to the S plane generation part 18.

The scanner 13 generates light reception signals of four colors of R (Red), G (Green), B (Blue) and K (Black). The scanner 13 includes a document feeder 20, an optical system 21 and an image generation part 22.

The document feeder 20 conveys a document G onto a glass table 19.

The optical system 21 generates the image data by scanning the document surface on the glass table 19. The optical system 21 outputs a K image signal, an R image signal, a G image signal and a B image signal to the image generation part 22 by a CCD (Charge Coupled Device) sensor 24.

The optical system 21 includes a light source 43, plural mirrors 52, a lens 27, the CCD sensor 24 and the image generation part 22.

Light from the light source 43 is guided to the mirror 52.

The lens 27 gathers the reflected light from the mirror 52 onto the CCD sensor 24. The CCD sensor 24 generates light energy charge by photoelectric conversion.

The CCD sensor 24 includes photodiode lines of plural lines. Each of the photodiode lines detects the reflected light in a main scanning direction in one line. The document G moves in a sub-scanning direction. The CCD sensor 24 stores charge, and then outputs the stored charge. The CCD sensor 24 continuously outputs the charge amount for one line in the sub-scanning direction.

The image generation part 22 samples the charge amounts for four lines at sampling timing. The image generation part 22 generates digital signals represented by 0 and 1 for respective RGBK. Each of the digital signals is correlated with position information on the document surface.

The network interface 14 receives print spool data from the PC 26 through a network 25. The network interface 14 receives print setting using the special color S from the PC 26.

The network interface 14 analyzes a drawing command from PDL (Page Description Language) data included in the print spool data. The drawing command includes type information such as a character, a graphic pattern and graphics.

The printer driver 61 (input part) corresponding to a multi-functional function of the MFP 10 is installed in the PC 26. The printer driver 61 inputs the image data to the S plane generation part 18.

Besides, the image processing part 23 converts the image data of RGBK from the scanner 13 into the image data of CMYK (in the following description, the image data of CMYK is sometimes called component data of four colors), respectively.

The image processing part 23 outputs the component data of the four colors by analyzing the PDL data from the network interface 14.

A signal processing device of an LSI (Large Scale Integration) is used as the image processing part 23.

The operation panel 17 includes plural hardware keys 53 and a window 54. A touch panel may be used as the window 54. In the operation panel 17, a key, a button, an icon and the like may be displayed on the touch panel.

The S plane generation part 18 adds the S plane data to the plane data of the four lines from the image processing part 23. The S plane generation part 18 outputs the plane data of five lines. An LSI or an ASIC is used as the S plane generation part 18.

The controller 100 is a main controller of the MFP 10.

Figure 2:
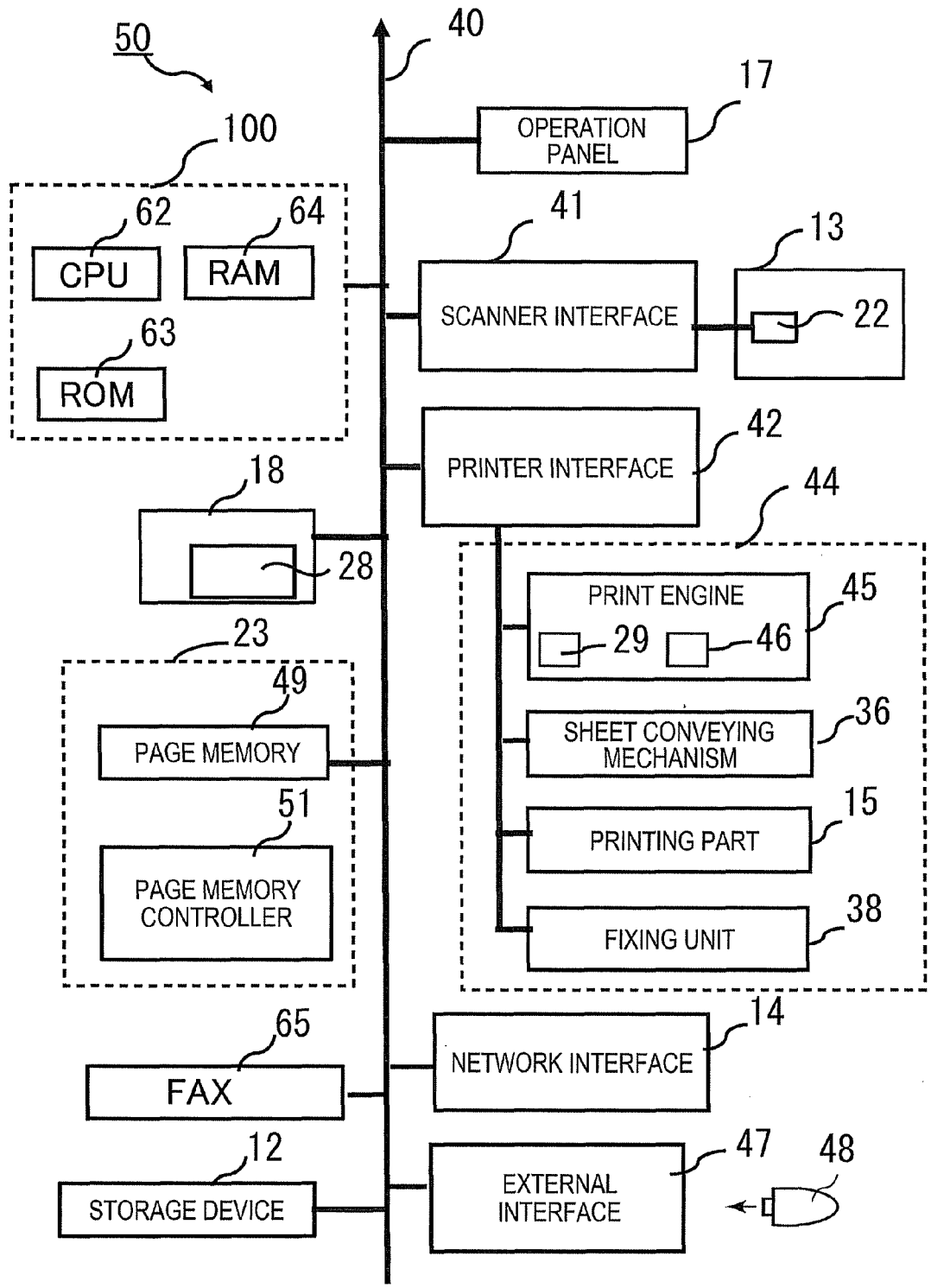
FIG. 2 is a block diagram of a control system of the image forming apparatus of the embodiment.

FIG. 2 is a block diagram of a control system of the MFP 10. The same reference numerals as those mentioned above denote the same components.

A control system 50 includes the image processing part 23, the operation panel 17, and the S plane generation part (conversion part).

The image processing part 23 includes a page memory 49 and a page memory controller 51. The page memory 49 stores the component data of the four colors. The page memory controller 51 adjusts plural accesses to the page memory 49.

Figure 3:
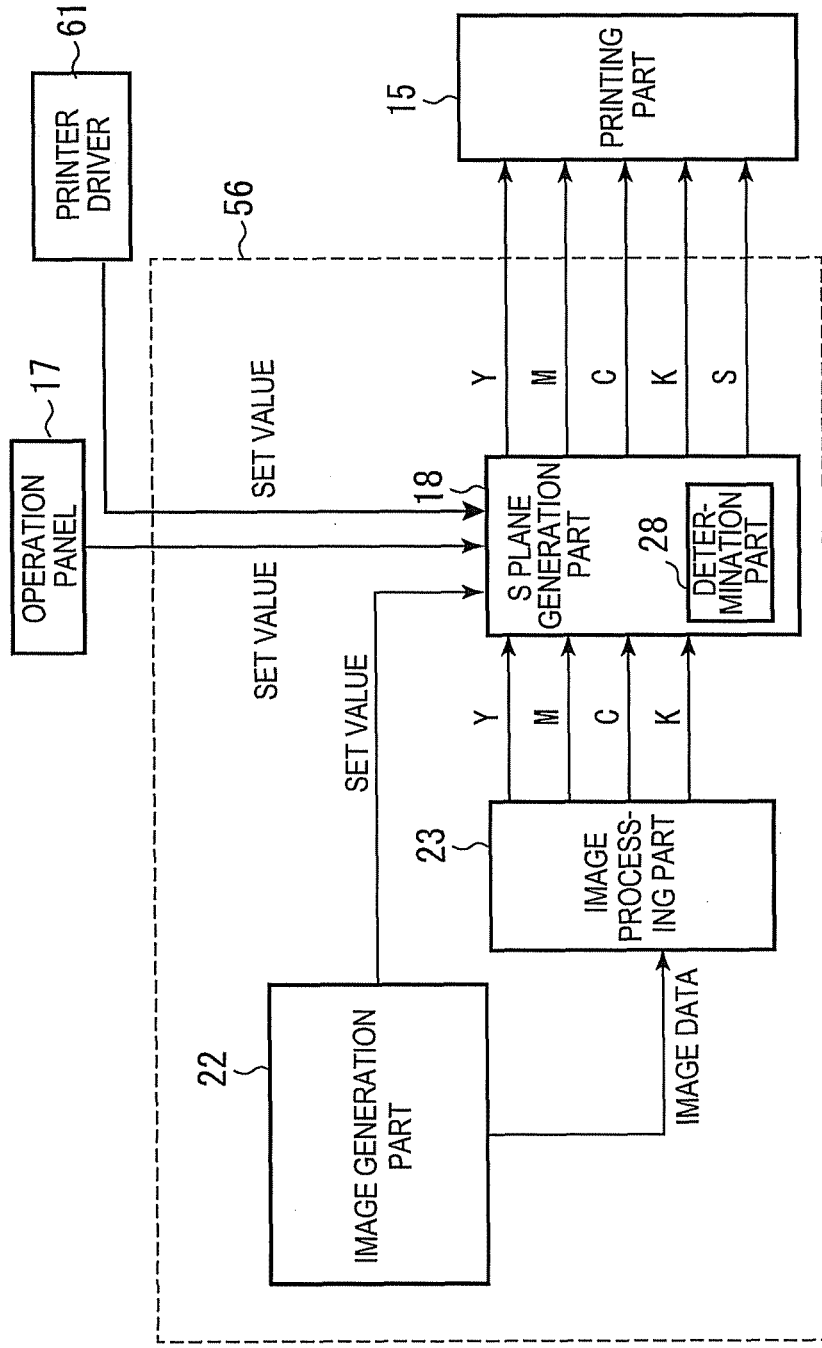
FIG. 3 is a block diagram of a circuit including an image processing part, a conversion part and a printing part of the image forming apparatus of the embodiment.

FIG. 3 is a block diagram of a circuit including the image processing part 23, the S plane generation part 18 and the printing part 15. The same reference numerals as those mentioned above denote the same components.

A circuit 56 flow-controls the image data, edits the image data, and processes the image data.

The operation panel 17 sends a set value corresponding to the conversion condition to the S plane generation part 18.

Specifically, the condition differentiates between types of (A) to (E):

(A) a pixel having a specific hue represented by CMYK values is replaced with the special color S;

(B) a pixel having a background color positioned in a background portion in an image is replaced with the special color S;

(C) a pixel of black K is replaced with the special color S;

(D) a pixel of color represented by CMY is replaced with the special color S; and (E) a pixel of a previously set character is replaced with the special color S.

The set value is one point in the color space of CMYK. Alternatively, the set value is a color range in the color space.

In (A), the set value is a CMYK value of the specific hue or a range of CMYK.

In (B), the set value is a range of CMYK values of the background color.

In (D), the set value is a CMY value or a CMY range.

In (E), the set value is character information such as date, time or WaterMark.

The S plane generation part 18 generates plane data of five lines by the respective set values from the operation panel 17 and the image generation part 22.

The S plane generation part 18 may generate plane data of five lines by the set values from the printer driver 61 of the PC 26.

The S plane generation part 18 includes a determination part 28. The determination part 28 determines whether a hue pattern represented by the component data of the four printing colors from the image processing part 23 coincides with the specific hue pattern previously specified by the condition for each pixel.

The specific hue pattern (specific color) is a previously determined coloring pattern and is represented by, for example, CMYK=0:255:0:0.

With respect to the pixel in which the coincidence is affirmed by the determination part 28, the S plane generation part 18 replaces the component data of magenta M among the four printing colors with the component data of the special color S.

The S plane generation part 18 may initially set the component data of all pixels to the component data of the special color S, and then, may replace the component data of the special color S of a pixel including one of the inputted component data of the four printing colors with the one of the component data of the four printing colors.

The S plane generation part 18 may replace the component data of the black K from the image processing part 23 with the component data of the special color S.

The S plane generation part 18 may replace the component data of colors represented by cyan, magenta and yellow from the image processing part 23 with the component data of the special color S.

The S plane generation part 18 may replace the character information in the image data detected by the image processing part 23 with the special color S.

Besides, in the image forming method of the embodiment, the operation panel 17 or the printer driver 61 specifies the condition.

The image processing part 23 outputs the component data of the four printing colors by scan input or received input for each pixel.

The S plane generation part 18 converts the component data of the four printing colors into the component data of the five colors based on the condition.

The printing part 15 forms an image by using the four printing colors and the special color S.

When the condition is specified, the component values of cyan, magenta, yellow and black may be respectively specified by the operation panel 17 or the printer driver 61.

In the conversion into the component data of the five colors, the S plane generation part 18 may initially set the component data of all pixels to the component data of the special color S, and then, may replace the component data of the special color S of a pixel including one of the inputted component data of the four printing colors with the one of the component data of the four printing colors.

Further, the control system 50 of FIG. 2 includes a bus 40, a storage device 12, a scanner interface 41, and a printer interface 42.

The storage device 12 is an HDD (hard disk driver) or an SSD (solid state drive). The scanner interface 41 interfaces data input and output between the controller 100 and the scanner 13.

The printer interface 42 interfaces data input and output between the controller 100 and the print control system 44.

The print control system 44 includes a print engine 45, a sheet conveying mechanism 36, a printing part 15 and a fixing unit 38.

The print engine 45 includes five exposure units 29 (only one exposure unit is shown in the drawing) and a driver circuit 46 for the five exposure units 29.

The controller 100 includes a CPU 62, a ROM 63 and a RAM 64.

The CPU 62 generates a copy job by signal input from the operation panel 17. The CPU 62 generates a print job by reception of a network print request from the network interface 14.

The RAM 64 expands a job management table of an OS (Operating System).

The ROM 63 stores the OS, application software and the like.

The ROM 63 is a non-transitory computer readable recording medium for causing the CPU 62 to perform following processes:
acquiring a condition from the operation panel 17 or the printer driver 61;
causing the image processing part 23 to output component data of four printing colors from image data for each pixel;
causing the S plane generation part 18 to convert the component data of the four printing colors into component data of multi color based on the condition; and
causing the image forming parts 31Y to 31S to form an image by using the four printing colors and the special color S.

The MFP 10 may include an external interface 47 and a FAX apparatus 65.

The external interface 47 inputs and outputs data between the controller 100 and, for example, a USB (universal Serial bus) memory 48.

The FAX apparatus 65 FAX-transmits a scanner output and transmits FAX-received image data by mail.

Next, an operation of the MFP 10 will be described.

Figure 4:
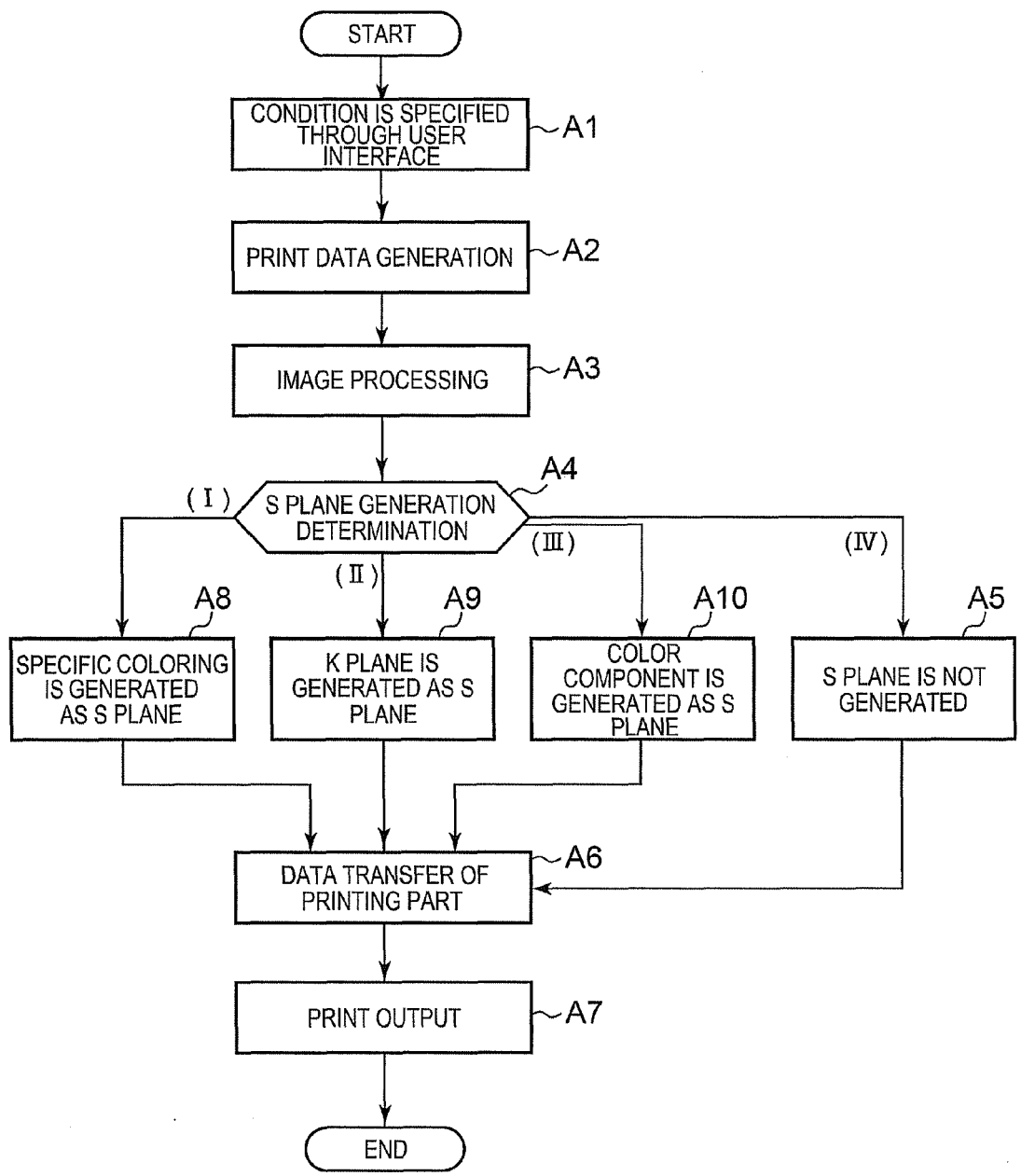
FIG. 4 is a flowchart for explaining a conversion process into a special color by the image forming apparatus of the embodiment.

FIG. 4 is a flowchart for explaining a conversion process into the special color S performed by the MFP 10.

In a normal process, first, the document G is set on the document feeder 20. A copy start key is selected.

At ACT 1, a condition is set through the operation panel 17.

Figure 5:
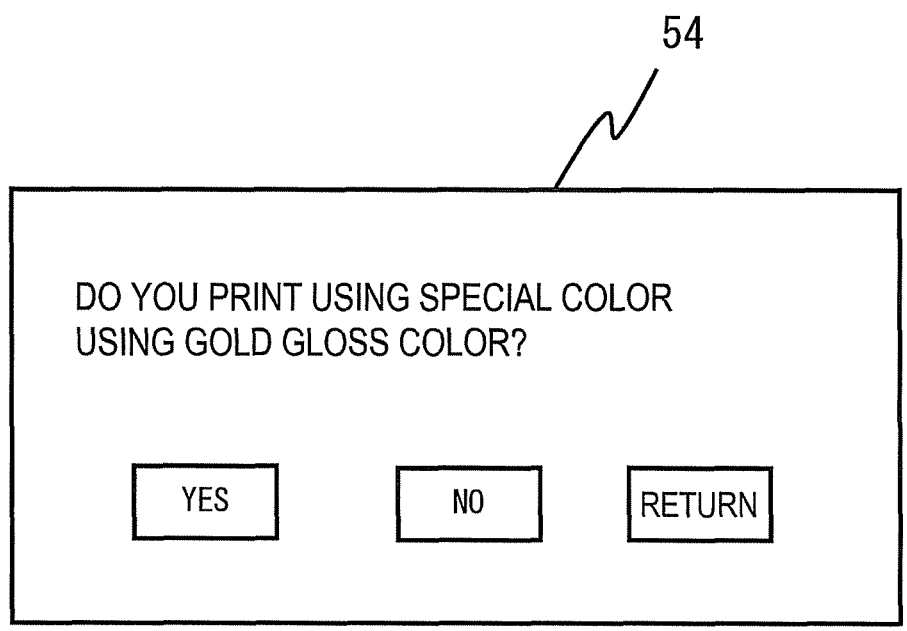
FIG. 5 is a view showing a display example of a user interface of the image forming apparatus of the embodiment.

FIG. 5 is a view showing a display example of the window 54 of the operation panel 17. "No" is assumed to be selected by a user operation.

At ACT A1 of FIG. 4, the operation panel 17 notifies the S plane generation part 18 of printing without using the special color S.

At ACT A2, the MFP 10 generates print data.

At ACT A3, the image processing part 23 performs image processing.

The image processing part 23 may perform compression and expansion, and image processing, such as shading correction, gradation correction, inter-line correction, resolution conversion, brightness adjustment, contrast ratio adjustment, saturation adjustment and sharpness adjustment, to image data of CMYK.

At ACT A4, the S plane generation part 18 determines the necessity of generating S plane data.

At ACT A4, the determination part 28 determines that the S plane generation part 18 is not required to generate the S plane data by reading of the set value from the operation panel 17.

The S plane generation part 18 transfers the image data to the printing part 15 at ACT A6 through a route denoted by (IV) at ACT A4.

At ACT A7, the printing part 15 prints and outputs.

As shown in FIG. 1, the printing part 15 forms electrostatic latent images of four colors on the corresponding drums 32. The printing part 15 develops the electrostatic latent images of the four colors with the corresponding toners.

The image forming parts 31C, 31M, 31Y and 31K transfer the corresponding toner images to the belt 30.

The printing part 15 forms the toner images of the single colors on the belt 30 in order from upstream to downstream in the counter clockwise direction V of the belt 30.

The secondary transfer unit 37 transfers the toner images of the four colors onto the sheet P. The fixing unit 38 fixes the toner images of the four colors on the sheet P.

The above is the description of the example in which the special color S is not used.

Hereinafter, an example using the special color S will be described.

(A) an Example in which a Specific Hue is Replaced with the Special Color S

In network printing, at ACT A1 of FIG. 4, the PC 26 opens a document file by application software.

When an icon for printing the document file is selected in the PC 26, the PC 26 starts the printer driver 61.

In the example of FIG. 5, "Yes" is assumed to be selected by a user operation.

Figure 6:
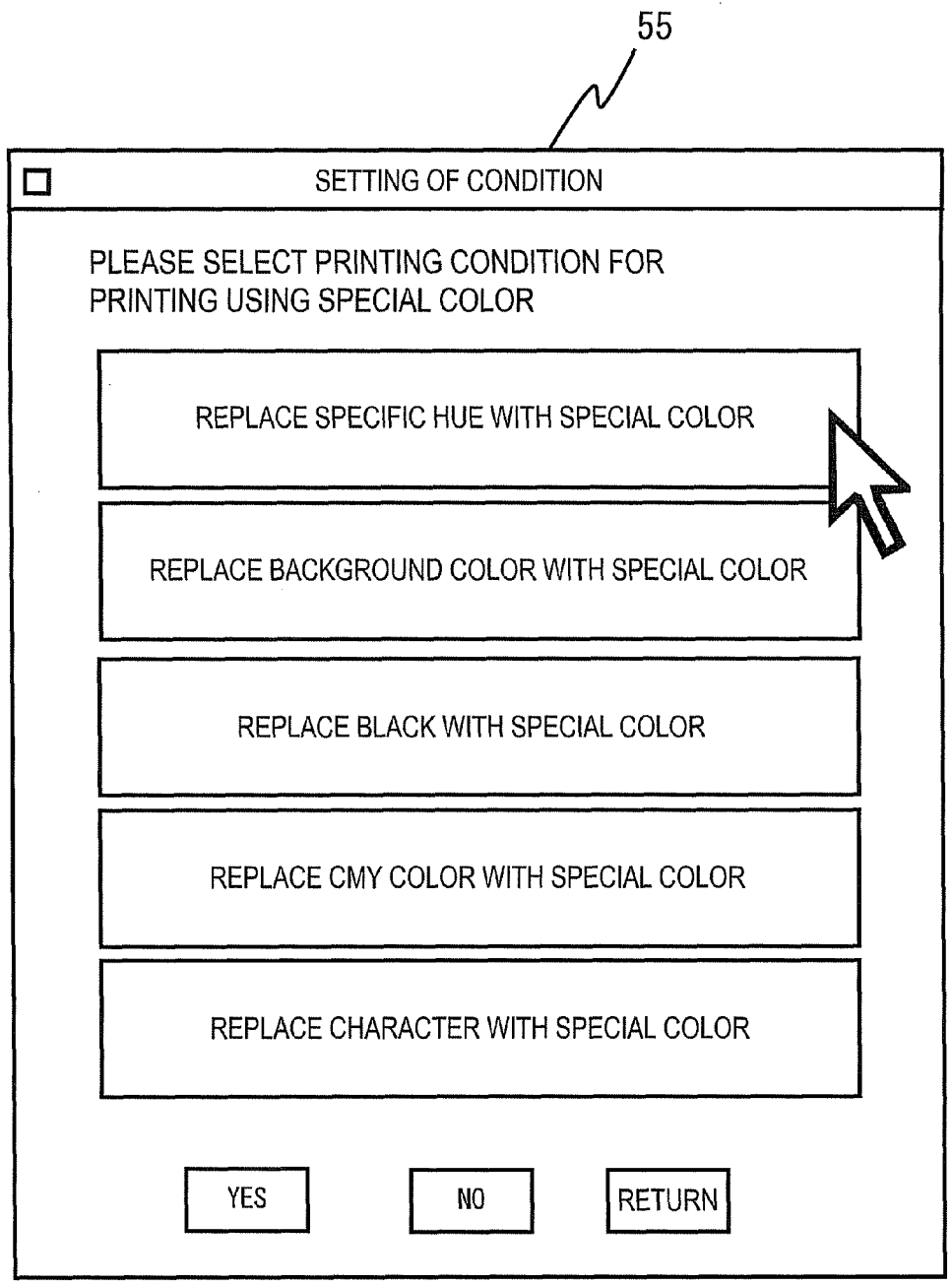
FIG. 6 is a view showing an example of a dialog screen displayed by the user interface of the image forming apparatus of the embodiment.

FIG. 6 is a view showing an example of a dialog screen displayed by the printer driver 61 (user interface). The printer driver 61 causes a display 55 to display the dialog screen. One of condition icons is selected.

Figure 7:
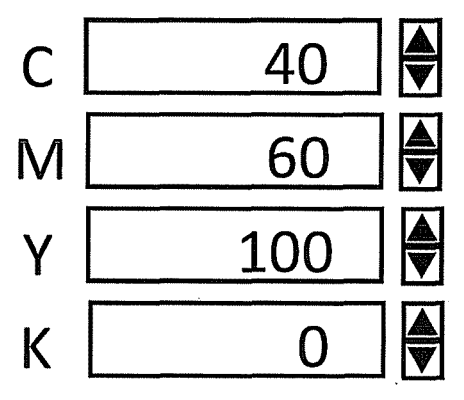

FIG. 7 is a view showing an example of a setting method of a set value by the printer driver 61. Numerical values of a specific hue or a color range are set by the user operation.

The printer driver 61 notifies the MFP 10 that the condition of replacing the specific hue with the special color S is selected by the user operation.

At ACT A1 of FIG. 4, the printer driver 61 generates print spool data. The printer driver 61 may cause the PC 26 to display a preview after application of the special color S. The PC 26 may select the condition before the generation of the print spool data.

Continuously, at ACT A2, the MFP 10 generates the component data of the four colors.

At ACT A2, the image processing part 23 generates image data by analyzing PDL data from the print spool data from the network interface 14. The image processing part 23 writes the component data of the four colors in the page memory 49 from the image data.

At ACT A3, the image processing part 23 performs image processing.

At ACT A4, the determination part 28 determines that the S plane generation part 18 is required to generate the S plane data.

The S plane generation part 18 generates the S plane data at ACT A8 through a route denoted by (I) at ACT A4.

In more detail, in FIG. 3, the image processing part 23 and the S plane generation part 18 share a condition that the specific hue (for example, CMYK=0:255:0:0) is used as an assigned value (special color use area).

The plane data of the four lines flow from the image processing part 23 to the S plane generation part 18 with respect to all pixels.

The S plane generation part 18 monitors a set of values of the plane data of the four lines.

At ACT A8 of FIG. 4, the S plane generation part 18 detects the value of CMYK=0:255:0:0. At ACT A8, the S plane generation part 18 adds the S plane data to the respective plane data of CMYK.

At ACT A6, the S plane generation part 18 sends the plane data of the five lines to the printing part 15.

Specifically, in FIG. 3, the S plane generation part 18 analyzes the stream of the plane data of the five lines.

The S plane generation part 18 adds "1" to the value of the S plane data by detection of the plane data coincident with the set value or the threshold from the operation panel 17.

The S plane generation part 18 sets values of a relevant place of the data stream of the analysis origin to "0". The relevant place indicates four color components at a time point.

At ACT A7 of FIG. 4, the printing part 15 prints plural pixels in a color range by using toner of the special color S instead of printing with CMYK.

The color range indicates a hue range having values from a first threshold to a second threshold in the color space represented by the CMYK values.

The plural pixels include the pixel where the value of 0:255:0:0 is, detected and the pixel in the color range having the value of 0:255:0:0 as one threshold.

The printing part 15 prints the plural pixels, in which the values of the S plane data are "1", with the special color S.

At ACT 7, with respect to the pixel printed with the special color S, the exposure unit 29 (FIG. 1) exposes the drum 32 of the image forming part 31S.

The printing part 15 drives the image forming parts 31C, 31M, 31Y, 31K and 31S. The printing part 15 performs print output using the toner image in which mapping is performed from the specific hue to the special color S.

In addition to printing of one pixel, the plural pixels including the one pixel are converted into the special color S. The effect of the special color S can be visually confirmed.

Printing using the special color S instead of the specific hue becomes possible.

The image data for printing to the S plane generation part 18 is desirably data after image processing such as filtering or masking is performed.

An example in which the special color S is set from the operation panel 17 is substantially the same as the example of the printer driver 61. The set value or the threshold may be set by the operation panel 17.

According to the image forming apparatus of the embodiment, in addition to the toners of CMYK, the toner of the special color S is newly added as the fifth color and printing can be performed.

For example, printing using gloss color, such as gold, silver or copper, fluorescent color, or lame-containing toner becomes possible.

(B) Example in which the Background Color is Replaced with the Special Color

An image is assumed to include a person and a background.

The printer driver 61 sets a condition, in which the background color of the background portion of the image is replaced with the special color S, in the S plane generation part 18 (FIG. 6).

The MFP 10 determines the necessity of generating the S plane data under the condition in which the background color of the image is replaced with the special color (ACT A1 to ACT A4 of FIG. 3).

At ACT A4, when the S plane generation part 18 determines that the replacement is necessary, the S plane generation part 18 once sets the initial value of the S plane data to "1" through the route (I) at ACT A8.

The component data of all pixels are initially set to the component data of the special color S.

At ACT A8, the S plane generation part 18 analyzes the stream of the plane data of the four lines and rewrites the value of the S plane data of the plane data of a line including a value among the four lines of CMYK to "0".

That is, with respect to the pixel in which the plane data value is detected, the component data of the special color S is returned to the component data of the four printing colors.

The S plane generation part 18 sends the plane data of the five lines to the printing part 15 (ACT A6). The printing part 15 prints and outputs (ACT A7).

An operation of replacing the background color with the special color in a copy job is substantially the same as that of the example of the printer driver 61.

The background portion of the image is changed into the special color S instead of the background color.

In the copy job and the network print job, the special color S is used as the background color, and printing becomes possible.

(C) Example in which Black K is Replaced with the Special Color S

The printer driver 61 notifies the S plane generation part 18 of the selection result that black K is replaced with the special color S (FIG. 6).

The MFP 10 determines the necessity of generating the S plane data under the condition in which black K is replaced with the special color S (ACT A1 to ACT A4, FIG. 6).

When the S plane generation part 18 determines that the generation is necessary (route (II) of ACT A4), the S plane generation part 18 replaces the K plane data with the S plane data (ACT A9).

At ACT A9, the S plane generation part 18 analyzes the stream of plane data of black and sets the value of the S plane data of a pixel corresponding to the K plane data including a value to "1".

The S plane generation part 18 sends the plane data of the respective lines to the printing part 15 (ACT A6). The printing part 15 prints and outputs without using the image forming part 31K of black (ACT A7).

An operation of replacing black K with the special color S in a copy job is substantially the same as that of the example of the printer driver 61.

The K plane data is not printed in the printing in which black is replaced. The printing using the special color S without black becomes possible.

For example, light and shade represented by black can be represented by gold color. A portion represented by thin gray can be represented by thin gold.

(D) Example in which Color Represented by CMY is Replaced with the Special Color S The printer driver 61 sets a condition, in which a color component is replaced with the special color S, in the S plane generation part 18 (FIGS. 6 and 7).

The MFP 10 determines the necessity of generating S plane data under the condition in which the color represented by CMY is replaced with the special color S (ACT A1 to ACT A4, FIG. 6).

When the S plane generation part 18 determines that the replacement is necessary (route (III) of ACT A4), the S plane generation part 18 replaces C plane data, M plane data and Y plane data corresponding to the color component with the S plane data (ACT A10).

At ACT A10, the S plane generation part 18 analyzes the stream of the plane data of the four lines and monitors the respective plane data of CMY among CMYK.

The S plane generation part 18 sets the value of the S plane data of a pixel corresponding to plane data including a value among the C plane data, the M plane data and the Y plane data to "1".

The S plane generation part 18 sends the plane data of the respective lines to the printing part 15 (ACT A6). The printing part 15 prints and outputs without using the image forming parts 31C, 31M and 31Y (ACT A7).

An operation of replacing color with the special color S in a copy job is substantially the same as that of the example of the printer driver 61.

Under the condition in which the color component is replaced, the respective plane data of CMY are not printed. The printing in which the color component is replaced with the special color S becomes possible.

A mono-color image of only black K and the special color S is obtained.

An inputted pixel includes the respective components of CMY. The values of the respective components are inherited to the special color S.

The gradation and hue of the inputted color image is held by the mono-color image.

(E) Example in which a Character is Replaced with the Special Color S

In the above (A) to (D), a character may be replaced with the special color S.

The printer driver 61 notifies the S plane generation part 18 of a character type before execution of a network print job (FIG. 6).

The image processing part 23 inserts, for example, web site address, network ID (identification), date, time, WaterMark and the like into the image data for printing.

The printing part 15 prints an image by the image forming parts 31C, 31M, 31Y and 31K. The image forming part 31S forms a latent image on the drum 32 by S plane data indicating a character string.

Also with respect to a character added to the image data in the MFP 10, the special color S can be selected.

As described above, in the image forming apparatus of the embodiment, the image forming part 31S is added and the special color S (addition color) can be printed.

The dedicated color plane (color bit map) represented by the five colors can be printed.

Besides, the color plane can be generated in accordance with the condition from the print image. The color plane can be generated from the component of the specific hue specified by the user or the color component represented by CMY.

(F) Modified Example

The above embodiment is the example of the copy job and the network print job.

The MFP 10 can generate the color plane similarly to the copy job also in a scanner job in which scanned image data is stored in a remote server.

The MFP 10 can store an image file using the special color S in the server by setting a condition for the scanned image data.

The MFP 10 may display a file from the USB memory 48 on the operation panel 17. The MFP 10 may generate an image file using the special color S from image data of the file by setting a condition in the operation panel 17.

The MFP 10 may store an image file in the USB memory 48. The MFP 10 may store a file, which includes image data in which a color plane is generated, in the server or the storage device 12.

The MFP 10 may mail an image file using the special color S.

In a FAX transmission job of scanned image data, the MFP 10 may generate a color plane using the special color S.

The MFP 10 may store, as a FAX transmission file, an image file generated by using the special color S in the storage device 12.

In the above embodiment, with respect to the component value pattern CMYK=0:255:0:0, magenta M is replaced with the special color S. The (CMYK) values of a specific hue pattern can be variously set, and a single color different from magenta M may be replaced with the special color S.

In the above embodiment, the examples of FIGS. 1, 2, 6 and 7 can be variously modified.

The determination part 28 has also a function to detect an arbitrary component pattern of CMYK.

The computer readable recording medium is for causing the CPU to perform the respective processes, and the recording medium may be a USB memory, a CD-ROM or a DVD-ROM.

The superiority of the image forming apparatus, the image forming method and the recording medium of the embodiment is not impaired in embodied products of these modifications.

While certain embodiments have been described, these embodiments have been presented by way of example only, and are not intended to limit the scope of the inventions. Indeed, the novel methods and systems described herein may be embodied in a variety of other forms; furthermore various omissions and substitutions and changes in the form of methods and systems described herein may be made without departing from the spirit of the inventions. The accompanying claims and their equivalents are intended to cover such forms or modifications as would fall within the scope and spirits of the inventions.

What is claimed is:

1. An image forming apparatus comprising:
an image forming part to form an image made of a plurality of pixels by using a plurality of printing colors and a special color different from the plurality of printing colors;
an input part of image data of the image;
an image processing part to output component data of the plurality of printing colors from the image data for each of the pixels;
a user interface to specify a condition for converting the component data of the plurality of printing colors into component data of a multi color in which the special color is added to the plurality of printing colors; and
a conversion part to convert the component data of the plurality of printing colors from the image processing part into the component data of the multi color to the image forming part based on the condition of the user interface.

2. The apparatus of claim 1, further comprising:
a determination part to determine whether a first hue pattern represented by the component data of the plurality of printing colors is coincident with a specific second hue pattern previously specified by the condition for each of the pixels; wherein
the conversion part replaces the component data of the plurality of printing colors with the component data of the special color for the pixel in which coincidence is affirmed by the determination part.

3. The apparatus of claim 1, wherein
the conversion part initially sets the component data of all the pixels to the component data of the special color, and then, replaces the component data of the special color of the pixel including one of the inputted component data of the plurality of printing colors with the one of the component data of the plurality of printing colors.

4. The apparatus of claim 1, wherein
the conversion part replaces the component data of black from the image forming part with the component data of the special color.

5. The apparatus of claim 1, wherein
the conversion part replaces the component data of cyan, magenta and yellow respectively including values from the image processing part with the component data of the special color.

6. The apparatus of claim 1, wherein
the conversion part replaces character information in the image data detected by the image processing part with the special color.

7. An image forming method comprising:
specifying, by a user interface, a condition for converting component data of a plurality of printing colors into component data of a multi color in which a special color different from the plurality of printing colors is added;
outputting component data of the plurality of printing colors by input of image data of an image made of a plurality of pixels for each of the pixels;
converting the component data of the plurality of printing colors into component data of the multi color based on the condition; and
forming the image by using the plurality of printing colors and the special color.

8. The method of claim 7, wherein
in the specifying the condition by the user interface, component values of cyan, magenta, yellow and black are respectively specified by an operation panel or a printer driver of a personal computer.

9. The method of claim 7, wherein
in the converting the component data of the plurality of printing colors into the component data of the multi color,
previously set character information is detected from the image data,
whether a first hue pattern represented by the component data of the plurality of printing colors is coincident with a specific second hue pattern previously specified by the condition is determined for each of the pixels, and
the component data of the plurality of printing colors is replaced with the component data of the special color for the pixel in which coincidence is affirmed.

10. A non-transitory computer readable recording medium, the medium comprising
causing a processor provided in an image forming apparatus to perform:
acquiring, from a user interface, a condition for converting component data of a plurality of printing colors into component data of a multi color in which a special color different from the plurality of printing colors is added;
outputting, by an image processing part, component data of the plurality of printing colors from image data of an image made of a plurality of pixels for each of the pixels;
converting, by a conversion part, the component data of the plurality of printing colors into the component data of the multi color based on the condition; and
forming, by an inform forming part, the image by using the plurality of printing colors and the special color.

* * * * *